Nov. 16, 1937.  H. E. FRACKER  2,099,298
ELECTRICAL TESTING APPARATUS
Filed Sept. 21, 1935  5 Sheets-Sheet 1

Fig.1

INVENTOR.
Henry E. Fracker
BY
Lyon & Lyon
ATTORNEYS

Nov. 16, 1937.	H. E. FRACKER	2,099,298
ELECTRICAL TESTING APPARATUS
Filed Sept. 21, 1935	5 Sheets-Sheet 2
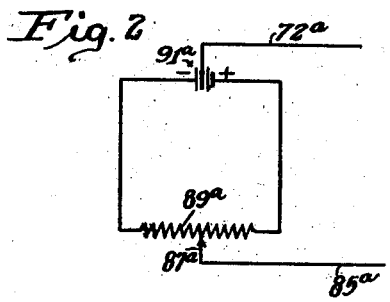
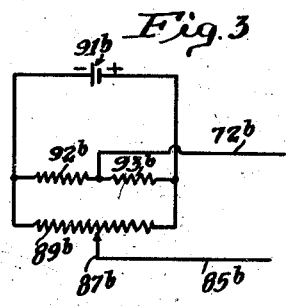
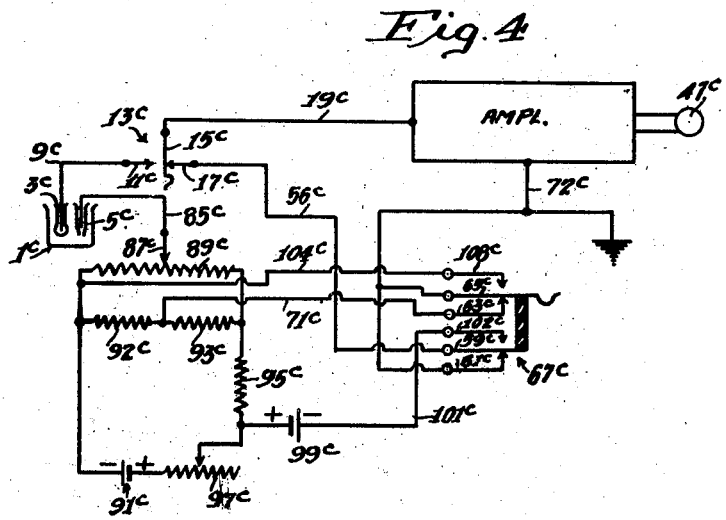
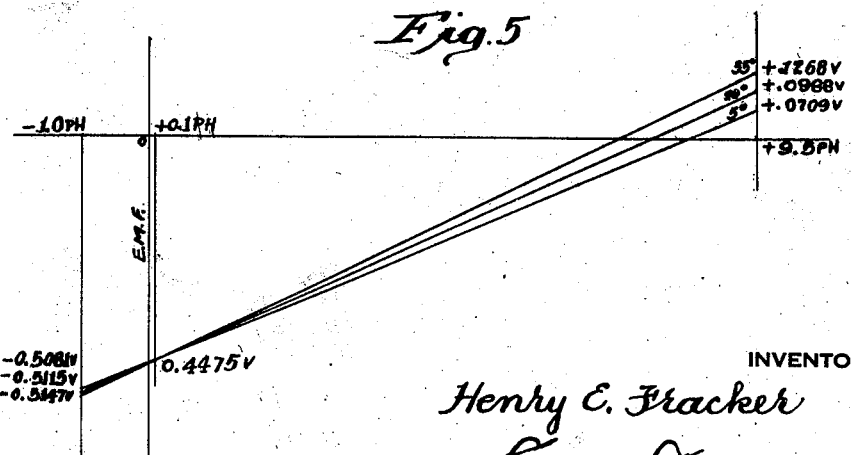
INVENTOR.
Henry E. Fracker
BY
Lyon & Lyon
ATTORNEYS Nov. 16, 1937.   H. E. FRACKER   2,099,298
ELECTRICAL TESTING APPARATUS
Filed Sept. 21, 1935   5 Sheets-Sheet 4
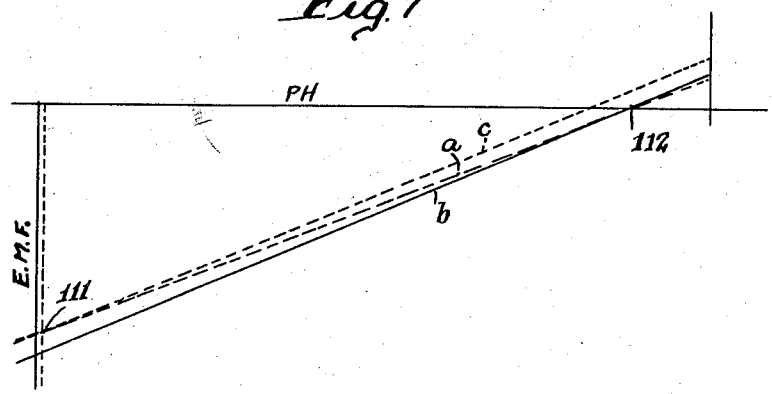
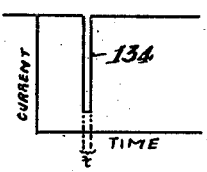 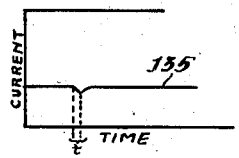 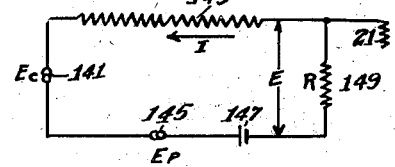
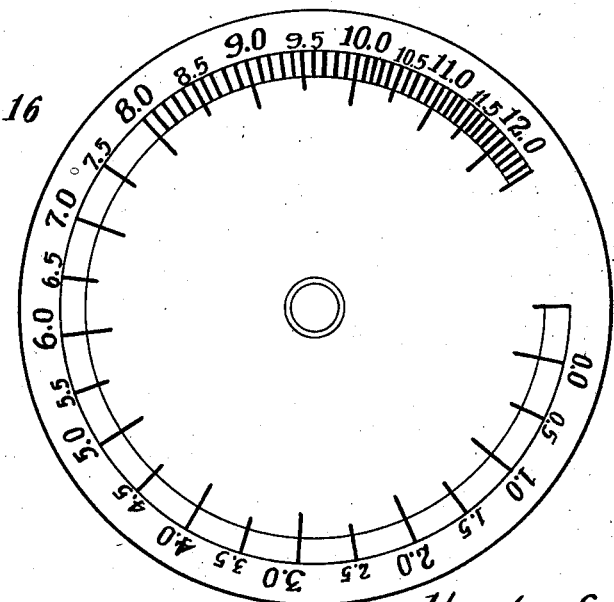
INVENTOR.
Henry E. Fracker
BY Lyon & Lyon
ATTORNEYS Patented Nov. 16, 1937

2,099,298

UNITED STATES PATENT OFFICE 2,099,298

ELECTRICAL TESTING APPARATUS

Henry E. Fracker, Pasadena, Calif., assignor to National Technical Laboratories, Pasadena, Calif., a corporation of California Application September 21, 1935, Serial No. 41,603

14 Claims. (Cl. 175—183)

This invention relates broadly to electrical testing apparatus and has particular application to the measurement of potentials in extremely high resistance circuits. A specific field in which it is especially useful is in the determination of the acidity or pH of solutions.

Many features of this invention may also be employed to advantage in colorimeters, densitometers, photometers, electric titrating devices and other apparatus in which potentials of extremely high resistance circuits are to be measured or utilized.

It has been found convenient in pH determination to employ a voltaic cell having as electrolyte the unknown solution to be tested, in which are immersed a pair of especially chosen electrodes, at least one of which makes electrical contact with the electrolyte through a thin glass wall. The potential of the cell is a direct function of the pH of the electrolyte so that by measuring the potential the pH of the solution constituting the electrolyte may be determined. It is a problem to accurately measure the potentials of such cells because of their extremely high internal resistance, resulting from the use of the glass-electrode.

In copending application for United States Letters Patent of Arnold O. Beckman and Henry E. Fracker, Serial No. 748,048, filed October 12, 1934, there is described a testing circuit for accurately measuring the potentials of glass-electrode cells by the null method. In that circuit the cell to be measured is connected in series opposition with a direct reading potentiometer and the input circuit of a special voltage indicating amplifier having a meter in its output circuit. The amplifier is designed to have an extremely high input resistance and indicates with sufficient accuracy when the potential of the potentiometer is equal to that of the cell being measured.

A broad object of the present invention is to make the described system even more accurate and reliable, more nearly fool-proof and more rapid and convenient to operate.

More specific objects of the invention are:

(1) To provide an accurate potentiometer which is simple in construction and which supplies potentials over a continuous range including both positive and negative values;

(2) To provide a potentiometer that may be easily and quickly standardized without changing the setting of the indicating dial;

(3) To provide a potentiometer for measuring pH voltage equivalents that is adjustable to indicate pH values directly at several different temperatures;

(4) To reduce the error resulting from leakage currents in high resistance voltage indicating circuits;

(5) To reduce swinging of the indicating needle of a meter in the output circuit of a D. C. amplifier when the input circuit is momentarily disconnected from a source of potential being measured;

(6) To provide a satisfactory method of varying the gain in a D. C. vacuum tube amplifier employing a screen grid tube;

(7) To reduce errors resulting from grid current when employing a vacuum tube amplifier as an indicating device in voltage comparison circuits.

Various other minor objects and features of the invention will be apparent from the following detailed description which refers to the drawings.

In the drawings:

Fig. 1 is a circuit diagram of a complete acidimeter, or pH measuring unit, in accordance with the invention;

Fig. 2 is a detail circuit showing one form of potentiometer for supplying a range of potentials, including both positive and negative values;

Fig. 3 shows a further modification of the simple circuit shown in Fig. 2;

Fig. 4 is a further development of the circuit shown in Fig. 3, the circuit being arranged for standardization against a standard cell;

Fig. 5 is a diagram illustrating the relation between the pH of a solution employed as electrolyte in a measuring cell and the potential across the electrodes of the cell at different temperatures;

Fig. 7 is a diagram illustrating how the scale v. voltage characteristic of a potentiometer may be altered both as to slope and position to provide temperature compensation;

Fig. 12 is a graph illustrating the effect produced on the plate current of the output tube of a conventional D. C. amplifier having an even number of stages, by momentarily opening the grid circuit of the first tube;

Fig. 13 is a graph illustrating the greatly reduced effect on the plate current of the second tube of the two stage D. C. amplifier disclosed in Fig. 1, caused by the momentary opening of the grid circuit of the first tube;

Fig. 14 is a schematic circuit employed to explain the effect of grid current in the circuit of Fig. 1;

Fig. 16 is a view of a part of a potentiometer scale calibrated in pH units and adapted to cover the pH range up to +12.5.

Figure 8:
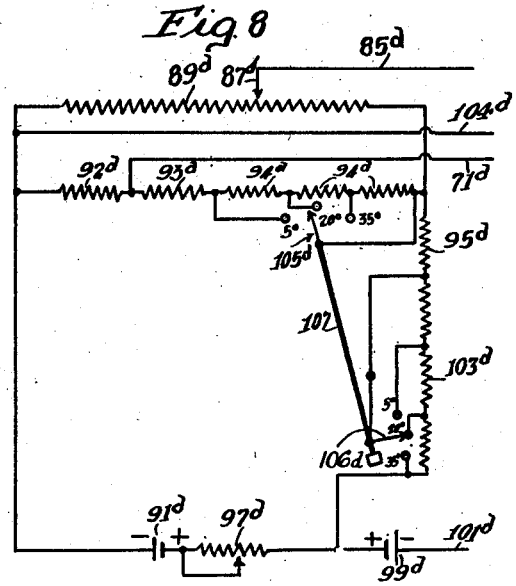
Fig. 8 is a diagram illustrating one form of temperature compensation circuit for use with a potentiometer adapted to directly indicate pH values.

A very general description of the complete circuit shown in Fig. 1 will first be given and this will be followed by detailed descriptions of the various new features, with reference to the remaining figures of the drawings.

*General description*

Referring to Fig. 1, the system therein disclosed includes a test cell 1 which may comprise a glass electrode 3 and a calomel electrode 5 immersed in a solution to be tested, which is contained in a beaker 7. The glass electrode 3 is connected by a conductor 9 to the front contact 11 of a transfer switch 13, which switch also includes a transfer contact 15 and a back contact 17. The transfer contact 15 is connected by a lead 19 directly to the control grid 21 of a screen grid tube 23, the latter having a filamentary cathode 25, a screen grid 27 and an anode 29. The anode 29 is connected by a lead 31 through a resistance 33 to the positive terminal of a B battery 35 and is also connected through a biasing battery 37 to the grid 39 of an output tube 41, the latter constituting a triode having, in addition to the grid 39, a filamentary cathode 43 and an anode 45.

Anode 45 is connected through an indicating milliammeter 47 to the positive terminal of the B battery 35. Cathodes 25 and 43 of the two tubes are connected in series with each other and an A battery 49 through contacts 48 and 50 of a control switch 51. To improve the operating characteristics of the input tube 23 the filament 25 is operated at a relatively low temperature and to this end this cathode is shunted by a resistance 53.

The circuit from the grid 21 is completed back to the cathode of that tube either through the front contact 11 of switch 13, the cell 1, the potentiometer 55 (to be described in detail later) and the back contact 63 and transfer contact 65 of a switch 67, or through the back contact 17 of switch 13, a conductor 56, a transfer contact 59 and back contact 61 of switch 67, to a grid return lead 72, which connects to a sliding tap 73 on a resistor 75, the latter being connected in series with a resistor 77 and a variable resistor 79 all of which are in shunt to the cathode 43 of tube 41. Another resistor 81 is shunted between the tap 73 and the junction point between resistors 75 and 79. The circuit including resistors 77, 75, 81 and 79 has as its function to provide a variable bias on the grid return lead 72 to compensate for the variations in the strengths of the A battery 49, the B battery 35 and the bias battery 37. This circuit is fully described in copending application Serial No. 748,048 and per se does not constitute a part of the present invention.

To operate the circuit of Fig. 1, the switch 51 is closed to energize the cathodes of the two vacuum tubes and the potentiometer circuit 55, the potentiometer battery 91 being in series with the contacts 52 and 54 of switch 51. Then with switches 13 and 67 in the normal position shown, the tap 73 on resistor 75 and the variable resistor 79 are adjusted to such value as to cause the meter 47 in the output circuit of the amplifier to give a predetermined reading near the middle of its scale. The transfer switch 13 is then actuated to close the contact 15 on the contact 11, thereby connecting the test cell and the potentiometer 55 in series between the grid 21 and the grid return lead 71. Now if the potentiometer 55 is adjusted to provide a potential equal in magnitude but connected in opposition to the potential of the cell 1, then the meter 47 will give the same reading as it did with the transfer switch 13 in normal position. If the same reading is not obtained, then the potentiometer 55 is adjusted until the system is balanced. When a condition of balance has been reached, as indicated by no deviation of the needle of the meter 47, when the transfer switch 13 is actuated, then the potentiometer indicates the value of the potential of the cell 1.

The portion of the circuit so far described corresponds closely to the circuit disclosed in the aforementioned copending application and serves as a necessary foundation for the proper understanding of the new features which are the subject matter of the present invention. These new features will now be taken up separately.

*Potentiometer circuits for providing a range of potentials including both positive and negative values*

The E. M. F. produced by the cell 1, which consists of a glass electrode and a calomel electrode immersed in a solution to be tested, varies with the pH of the solution. If it is desired to cover a pH range of from a −1 to +13, then the E. M. F. of the cell will vary from −.5115 volt to +.2476 volt at a temperature of 20° C. On account of the reversal of polarity of the cell, it is necessary to know the polarity of the potential as well as its magnitude.

The ordinary potentiometer consists of a slide resistor having a battery connected across its end terminals and having its output or E. M. F. terminals connected respectively to one end of the slide wire resistor and to the slide. With such an arrangement, potentials varying between zero and any desired positive value or between zero and any desired negative value may be obtained, but it is impossible to obtain from such a device a range of potentials including both positive and negative values simply by manipulation of the sliding contact. Hence it has been necessary, when employing the ordinary type of potentiometer, to provide a reversing switch in conjunction therewith for reversing the polarity of the E. M. F. supplied to the leads 85 and 72 (Fig. 1).

Obviously, it would be much more convenient to have a potentiometer capable of giving any potential within the desired range of positive and negative values simply by adjusting the potentiometer dial. It is even more desirable, in fact quite necessary, to provide such a continuous range of potentials where the potentiometer is calibrated directly in pH units instead of volts (such calibration being permissible since the potential corresponding to any pH value is constant at a given constant temperature).

A simple form of potentiometer circuit that is capable of supplying a continuous range of potentials, including both positive and negative values, is disclosed in Fig. 2 in which the conductors 72a and 85a correspond, respectively, to the conductors 72 and 85 in Fig. 1. The circuit comprises a calibrated resistor 89a having connected thereacross a multi-cell battery 91a. This circuit differs from the conventional circuit in that the lead 72a, instead of being connected to one terminal of the resistance 89a, is tapped into the battery 91a at a point intermediate the ends thereof. The conductor 72a is thereby maintained at a reference potential intermediate the potentials of the opposite ends of the resistor 89a. The slide 87a may be adjusted to a point on resistance 89a equal in potential to that of the lead 72a, thereby yielding zero potential across conductors 72a and 85a. On the other hand, if the slide 87a is moved to the left, the conductor 85a will become increasingly negative with respect to conductor 72a, and vice versa if the slide 87a is moved to the right along the resistor 89a, conductor 85a will become increasingly positive with respect to conductor 72a.

In practice, the circuit shown in Fig. 2 has the substantial advantage over the conventional potentiometer circuit that it is very easy to obtain zero potential by merely adjusting the slide 87a to the null point. On the other hand, in a conventional potentiometer, in order to obtain zero potential, the slider must be capable of moving clear to one end of the slide resistor so that no resistance is left between the slider and the end of the resistor. Note that in the circuit of Fig. 2, the resistance of the potentiometer winding 89a left in the circuit outside the maximum and minimum positions of the slider does not have to be zero.

The circuit of Fig. 2, although advantageous in certain respects, has defects for use in an acidimeter circuit of the type disclosed in Fig. 1. Thus the potentiometer employed in the circuit of Fig. 1 need only cover a voltage range extending from −.5115 to +.2476 or a total range of .7591 volt. Therefore, a single dry cell supplying 1.5 volts connected to the potentiometer satisfies the voltage range requirements. Obviously, the method of locating the zero point intermediate the ends of the resistor 89a which is disclosed in Fig. 2, is impossible where the battery 91a comprises only one cell.

Another way of obtaining the desired result, while employing a single cell, is disclosed in Fig. 3, in which elements corresponding to the elements of Fig. 2 bear the same numerals but with the suffix "b". In this circuit the slide resistor 89b is shunted by a pair of additional resistors 92b and 93b, respectively, connected in series and the lead 72b is connected to the junction point of resistors 92b and 93b. If resistors 92b and 93b are made equal in value, then zero potential will exist across conductors 72b and 85b when the slide 87b is at the center of the slide resistor 89b, and potentials of negative or positive value may be obtained by moving the slider to the left or to the right, respectively, of the center point. Obviously, by making resistors 92b and 93b unequal, the zero point on resistor 89b may be shifted to the right or the left to obtain a greater range of negative potential than positive potential or vice versa. The absolute values of resistors 92b and 93b is immaterial insofar as the location of the zero point on resistor 89b is concerned, this being dependent only upon the relative magnitudes. However, the resistances of resistors 92b and 93b are preferably kept high in order to reduce battery drain and for another reason to be described later.

In the manufacture of a potentiometer of the type disclosed in Fig. 3, the zero point of the slider 87b may be readily located by making both the resistor 89b and the slider 87b movable and attaching the calibrated scale to the resistor 89b. The resistor may then be moved into the position giving zero reading on the scale and the slider shifted until zero potential is obtained, whereupon the slider is locked in position and is not moved thereafter. In practice, the resistor 89b is circular in shape and mounted on a rotatable drum, to which a scale is attached, a separate, stationary pointer being provided to cooperate with the scale.

Potentiometer standardization circuit

As previously stated, it is desirable to employ as the battery 91b in Fig. 3 an ordinary dry cell since such cells are easily obtained, are convenient for use in portable instruments, and, under conditions of low current drain, maintain relatively stable potentials. However, for work of any accuracy, it is necessary to standardize a potentiometer employing a dry cell against a known source of E. M. F. A standard cell of the Weston unsaturated type offers a convenient source of fixed known potential and may be used to provide a constant reference potential. Such a cell has no temperature error, so far as the magnitude of accuracy required in the acidimeter circuit of Fig. 1 is concerned, and if made properly and not subjected to excessive current drains, it should maintain its E. M. F. constant over a period of many years. The E. M. F. of such a standard cell is about 1.0188 volts which, it will be observed, is greater than the potential range of .7591 volt required in my acidimeter, but is less than the potential of a standard dry cell (1.5 volts).

Heretofore it has been the general practice in standardizing a potentiometer circuit to set the potentiometer scale to the known value of the standard cell and connect them in series with each other through a galvanometer and a key, the polarity of the standard cell being reversed with respect to that supplied by the potentiometer so that the resultant potential applied to the galvanometer will be zero if the potentiometer is properly adjusted. If the potentiometer was not properly adjusted, as indicated by deflection of the galvanometer needle, then additional adjustable resistances in series with the potentiometer slide resistor and the potentiometer battery were adjusted to vary the current through the slide resistor until the potential drop between one end of the resistor and the slide exactly equaled the potential of the standard cell.

This old method has two serious disadvantages: (1) it necessitates adjustment of the potentiometer scale to the potential of the standard cell, thereby entailing an additional operation, which in turn necessitates still another additional operation, namely, resetting the potentiometer back to the test point following standardization of the potentiometer; (2) if the potentiometer is badly off balance, a considerable current can flow through the standard cell while the circuit is closed and, since the current through such a cell of the usual size should not exceed 100×10⁻⁶ ampere, even momentarily, it is obvious that in the hands of an unskilled person the standard cell may easily be permanently ruined.

The foregoing defects are avoided in my acidimeter by employing the potentiometer standardization circuit disclosed in Fig. 4 in which elements corresponding to those in the other figures bear the same reference numerals but with the suffix "c". In this circuit an additional resistor 95c and a resistor 97c are connected between one end of the potentiometer slide resistor 89c and the potentiometer battery 91c, and a standard cell 99c is connected between the lower end of resistor 95c and front contact 102c of a switch 67c. Cooperating contact 59c of switch 67c is connected through lead 56c and contacts 17c and 15c of switch 13c to the grid lead 19c of the amplifier. The grid return lead 72c of the amplifier is connected to contact 65c of switch 67c and the cooperating front contact 108c is connected through lead 104c to the left end of the potentiometer resistor 89c. Actuation of switch 67c therefore connects the standard cell 99c, the resistor 95c and resistor 89c in series with the amplifier input leads 19c and 72c.

The resistor 95c has a resistance such that the potential drop thereacross, added to the potential drop across the resistor 89c, just equals the potential of the standard cell (1.0188 volts) when the current through the potentiometer resistor is adjusted to the proper value. Therefore, if the current through resistor 89c is correct, no potential is impressed upon the amplifier input leads when switch 67c is actuated, and the output meter 47c so indicates. On the other hand, if the meter 47c indicates an unbalanced condition, the current through resistor 89c is adjusted until a balance is obtained, by varying the resistor 97c.

The value of resistor 95c may be determined for each acidimeter by substituting a source of known potential for the cell 1, setting the potentiometer to its proper position corresponding to the known E. M. F., and then adjusting the value of resistor 95c until the E. M. F. developed by the potentiometer is within a few tenths of a millivolt of its proper value, when resistor 97c has been adjusted to a balance against the standard cell. The value of resistor 95c is determined when the acidimeter is assembled and is not changed thereafter.

It will be observed that since the standard cell is balanced against the total potential drop across resistors 89c and 95c instead of across the potentiometer output leads 71c and 85c, it is not necessary to alter the position of the potentiometer slide in order to standardize the potentiometer, which considerably facilitates taking potentiometer scale readings.

Furthermore, it should be noted that in the circuit of Fig. 4, and also the circuit of Fig. 1, the standard cell is connected in the grid circuit of the amplifier which has an extremely high input resistance, so that no appreciable current is drawn from the standard cell, thus allowing the latter to be made very small in size compared to the usual standard cell; also it is impossible to draw an appreciable current from this cell regardless of how badly out of balance the potentiometer may be even if all the controls on the instrument are thrown entirely out of adjustment so that the standard cell, which is essentially delicate, cannot be injured by unskilled operation of the acidimeter, a considerable improvement over prior practice in which the standard cell was simply connected in series with a galvanometer across the output terminals of the potentiometer.

Two precautions must be observed in the construction of the circuit shown in Fig. 4: first, resistors 89c and 95c must be wound with wire having the same temperature coefficient so that as the ambient temperature changes, the ratio of the voltage drops across resistors 89c and 95c, respectively, will remain constant. If this were not the case, then an error of considerable magnitude would be introduced into the potentiometer scale reading, which error would not be eliminated by the standardizing operation; second, the ratio of the resistance of the resistors 92c and 93c to the resistance of resistor 89c must be large if commercial resistors having their usual high temperature coefficients are used. If resistors 92c and 93c are made about 100 times as large as resistor 89c, then assuming that resistors 92c and 93c are wound with resistance wire having the highest temperature coefficient of all commonly used wires, the error introduced into the pH measurements over an ambient temperature change of from 5° C. to 40° C. is a maximum of about .003 pH. This error or source of error would not be eliminated by the standardizing operation and is the additional reason previously referred to for making resistors 92c and 93c high. It will be recalled that the other reason for making these resistors high was to reduce battery drain.

*Temperature compensation circuits*

In general, the E. M. F. developed by a test cell comprising a glass electrode and a calomel electrode immersed in an acid solution varies with changes in temperature, the E. M. F. increasing with temperature. It happens, however, that the E. M. F. of the cell when the solution pH is +0.1 is constant (−0.4475 volt) irrespective of temperature. If the temperature is maintained constant but the pH varied, then the E. M. F. varies linearly with the pH change over the pH range from −1 to +9.5. The pH vs. E. M. F. characteristics of the cell at temperatures of 5°, 20° and 35° C. are shown in the graph of Fig. 5 in which the abscissae represent pH and the ordinates E. M. F. It will be observed that all three characteristics intersect at the point located at +0.1 on the pH scale and −0.4475 on the E. M. F. scale. The differences in the slopes of the three characteristics are exaggerated in the figure to prevent confusion.

It will be obvious from inspection of Fig. 5 that for any given temperature the pH is directly proportional to the E. M. F. of the cell within the pH range −1.0 to +9.5. Furthermore, in a potentiometer having a slide resistor of uniform resistance, the potential is directly proportional to the movement of the slide. It follows that for any given temperature the potentiometer scale may be calibrated in pH units instead of volts but the spacings between the scale divisions will be different for other temperatures. The same potentiometer could be used for solutions at different temperatures by providing several different scales. Mechanically this is not a desirable arrangement, however, and in accordance with the present invention I provide circuits for compensating electrically for different solution temperatures.

One such circuit is shown in Fig. 8 which, like that of Fig. 4, comprises a potentiometer slide resistor 89d, a sliding contact 87d connected to one E. M. F. output conductor 85d, with the other E. M. F. output conductor 71d connected to the junction between two series resistors 92d and 93d which are shunted across the slide resistor 89d. A standardizing resistor 97d is connected in series with the potentiometer battery 91d as in Fig. 4.

The circuit of Fig. 8 differs from that of Fig. 4 in that a tapped resistor 94d is connected in series with the resistor 93d and a tapped resistor 103d is inserted between the standardizing resistor 97d and the resistor 95d. A pair of switches 105d and 106d (preferably mounted on a common control shaft 107 for simultaneous movement) function to short out successive sections of the resistors 103d and 94d to adapt the device for use with solutions of temperatures at 5°, 15°, 25° and 35° C., respectively, while still employing only a single potentiometer scale calibrated directly in pH units.

The circuit of Fig. 8 functions as follows: Referring to Fig. 5, it will be observed that as the temperature is increased the change in E. M. F. for any given change in pH increases. Therefore at a temperature of 20°, for instance, a potentiometer graduated in pH units would have to vary its E. M. F. by a greater amount for a given pH scale movement than it would at a temperature of 5°. Now since the E. M. F. developed by the potentiometer is directly proportional to the current through the slide resistor thereof, the increased E. M. F. can be obtained by simply increasing the total current through the potentiometer. Such an increased current is obtained by cutting out a portion of the tapped resistor 103d. It must be noted, however, that increasing the total current through the potentiometer does not shift the point of zero potential on the slide resistor since that is determined solely by the resistance of the resistor 92d relative to resistors 93d and 94; it merely rotates the potentiometer characteristic about the zero axis. If the potentiometer is to indicate directly in pH units at the temperatures of 5°, 20° and 35° C., then when adjusted for those respective temperatures its E. M. F. v. scale deflection characteristic must coincide with the E. M. F. vs. scale characteristics shown in Fig. 5.

Referring now to Fig. 7, the line (a) represents both the E. M. F. vs. pH characteristic of the cell to be tested at 5° and the E. M. F. vs. deflection characteristic of the potentiometer circuit in Fig. 8 when set for 5°. Now if the switch 106d is moved to the 20° tap on resistor 103d, the slope of the potentiometer characteristic is changed but this change in slope is effected by rotation of the characteristic about its point of intersection with the E. M. F. base line, as shown by the line (b) in Fig. 7. Obviously, line (b) does not coincide with line (c) representing the cell characteristic for 20°, but it can be made to coincide therewith by shifting its zero point, and in Fig. 8 this shifting of the zero point is effected by varying the resistor 94d through movement of the switch 105d to the 20° tap. The E. M. F. vs. deflection characteristic of the potentiometer then coincides with the E. M. F. vs. pH characteristic of the cell at 20° C. (line (c) in Fig. 7) and the point on the slide resistor corresponding to the pH of a +0.1 is restored to its original potential of −0.4475 volt.

In actual operation the switches 105d and 106d are shifted simultaneously and then the circuit is restandardized by adjusting resistor 97d while battery 91d and resistor 97d are connected across a standard cell comparison circuit.

Although the circuit of Fig. 8 gives correct results, it has the disadvantage (from a manufacturing standpoint) of requiring the two tapped and calibrated resistors 94 and 103d, which are relatively expensive. The tapped resistor 94 may be eliminated by employing the circuit shown in Fig. 10, in which elements corresponding to those in the previously considered figures bear the same reference numerals with the suffix "e" attached.

Figure 10:
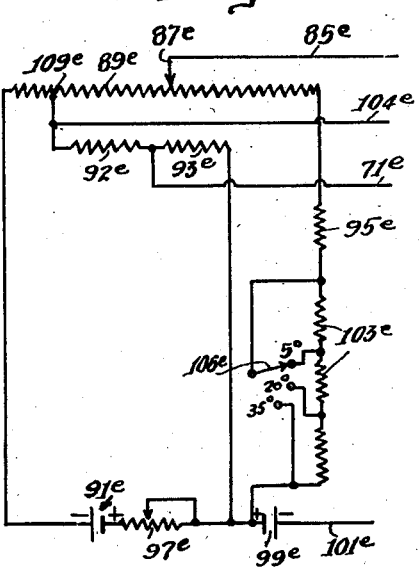

The circuit of Fig. 10 differs from that of Fig. 8 in that resistor 94d is omitted and resistor 93e has its free end connected directly to the right end of resistor 91e instead of to the end of the slide resistor 89e. It further differs from Fig. 8 in that the outer end of resistor 92e is connected to a tap 109e on the slide resistor instead of to the end of the latter. The tap 109e is located at a point corresponding to the pH scale reading of +0.1.

It will be recalled that the switch 105d in Fig. 8 functions to shift the zero E. M. F. point on the slide resistor so as to maintain constant the E. M. F. of the point on the resistor corresponding to a pH of +0.1 despite variations in the current through the slide resistor caused by adjustment of the switch 106d, the latter adjustment being necessary to change the slope of the potentiometer characteristic.

In Fig. 10 the slope of the potentiometer characteristic is changed as before by manipulating the switch 106e and thereby varying the current through the slide resistor 89e. However, in Fig. 10 it is not necessary to perform another operation to shift the point of zero E. M. F., because the point 109e is automatically maintained at a potential of −0.4475 volt (corresponding to a pH of +0.1) regardless of changes in the position of switch 106e and the value of the current in resistor 89e, by virtue of the fact that the point 109e is connected directly to the end of resistor 92e and the potential drop across resistors 92e and 93e is always the same after the standardizing operation since it is this potential across resistors 92e and 93e that is compared with the standard cell. The magnitudes of resistors 92e and 93e are made so large as compared to the resistance of the slide resistor 89e that the current flow through the resistor 89e to the left of the point 109e is not enough greater than that in the remainder of the slide resistor to cause errors of sufficient magnitude that they need be considered.

The circuit of Fig. 10 has the mechanical disadvantage that the slide resistor, which is preferably rotatably mounted on a drum and cooperates with a stationary slide contact 87e, has to be tapped at the point 109e, thereby necessitating a special spacing of the pH scale at that point with consequent error, unless the width of the tap is made to correspond exactly with the scale spacing. A very precise location of the pH scale on the potentiometer drum is required. Furthermore, the tap necessitates that a total of three flexible leads instead of two be brought out from the potentiometer, increasing the possibility of trouble developing in use.

Figure 9:
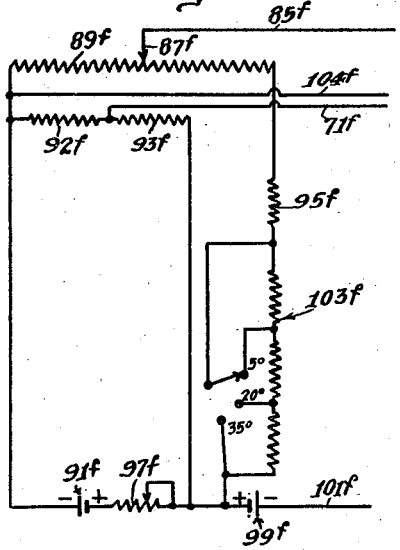
Figs. 9 and 10 illustrate modifications of the temperature compensating potentiometer circuit shown in Fig. 8.

If it is not necessary that the instrument cover a pH range extending below +0.1, that portion of the slide resistor to the left of point 109e (Fig. 10) may be eliminated and the necessity of a tap avoided. Such a modification is shown in Fig. 9 in which elements corresponding to elements in Fig. 10 bear the same reference numerals but with the suffix "f".

It is desirable, however, in most instances to extend the pH range below +0.1 and a preferred circuit for accomplishing this without tapping the slide resistor is shown in the complete circuit of Fig. 1.

The potentiometer circuit 55 in Fig. 1 differs from that of Fig. 10 in that the slide resistor 89, instead of itself being provided with a tap connection, is shunted by a stationary tapped resistor 90, the tap 110 thereon being connected to the left end of resistor 92 and to the conductor 104 leading to the standardizing switch 67. The remaining portion of the potentiometer corresponds exactly to that of Fig. 10 and the standardizing circuit corresponds to that previously described with reference to Fig. 4.

The standardizing operation must always be performed before the instrument is used and, as previously indicated, consists of first setting the temperature correcting switch 106 to the proper position and then adjusting the resistor 97 until no deflection of the milliammeter occurs when the switch 67 is actuated, thereby indicating that the potential across resistors 92 and 93 is equal to that of the standard cell 99.

As a result of the use of the tapped resistor 90, a fixed point intermediate the ends of slide resistor 89 corresponding to a pH scale reading of +0.1 may be maintained at a constant potential of −0.4475 volt with respect to the lead 71, regardless of adjustments of the temperature correction switch 106, and the voltage above and below this point always varies linearly by the same amount with respect to distance. This has been proved both experimentally and mathematically.

Figure 6:
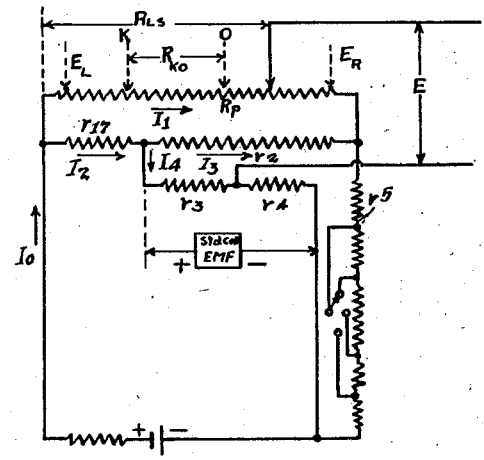
Fig. 6 is a schematic diagram of the potentiometer circuit shown in Fig. 1.

The mathematical analysis of the potentiometer set of Fig. 1 will now be given with reference to Fig. 6, which is a schematic diagram of the potentiometer circuit in Fig. 1 but with different reference symbols corresponding to the symbols used in the equations.

(1) $\quad E = I_1 R_{LS} - I_2 r_1 - \left(\dfrac{r_3}{r_3+r_4}\right) E.M.F.$ (2) $\quad I_2 r_1 = I_1 R_P - I_3 r_2$ (3) $\quad$ But $I_3 = I_2 - I_4 = I_2 - \dfrac{E.M.F.}{r_3+r_4}$ (4) $\quad \therefore$ Sub. in (2), $I_2 r_1 = I_1 R_p - \left(I_2 - \dfrac{E.M.F.}{r_3+r_4}\right) r_2$ (5) $\quad$ or $I_2(r_1+r_2) = I_1 R_P + \dfrac{E.M.F. \cdot r_2}{r_3+r_4}$ (6) $\quad \therefore I_2 = \dfrac{I_1 R_P + \dfrac{E.M.F. \cdot r_2}{r_3+r_4}}{r_1+r_2}$ (7) $\quad$ or $\therefore I_1 = \dfrac{I_2(r_1+r_2)}{R_p} - \dfrac{E.M.F. \cdot r_2}{(r_3+r_4) R_p}$ Substituting for $I_2$ in (1):—

(8) $\quad E = I_1 R_{LS} - \left(\dfrac{r_1}{r_1+r_2}\right)\left(I_1 R_p + \dfrac{E.M.F. \cdot r_2}{r_3+r_4}\right) - \dfrac{r_3 E.M.F.}{r_3+r_4}$ or:

(9) $\quad E = I_1 R_{LS} - \left(\dfrac{r_1}{r_1+r_2}\right) I_1 R_p - \left(\dfrac{r_1}{r_1+r_2}\right)\left(\dfrac{r_2 E.M.F.}{r_3+r_4}\right) - \dfrac{r_3 E.M.F.}{r_3+r_4}$ or:

(10) $\quad E = I_1\left(R_{LS} - \dfrac{r_1 R_p}{r_1+r_2}\right) - \dfrac{E.M.F.}{r_3+r_4}\left(\dfrac{r_1 r_2}{r_1+r_2} + r_3\right)$ From Equation 10 the following facts may be deduced:

(a) The equation is linear; $I_1$ and $R_{LS}$ are the independent variables, all the other terms being constants.

(b) E can be made independent of $I_1$ for one value of $R_{LS}$. This condition is fulfilled if $R_{LS}$ is made equal to $$\dfrac{r_1 R_p}{r_1+r_2}$$

It should be noted that $$\dfrac{E.M.F.}{r_3+r_4} = I_4,$$

a constant. Therefore, by properly choosing the values of $R_p$, $r_1$, $r_3$ and $r_4$, any desired point on the potentiometer drum can be made to have a constant potential with respect to the junction of $r_3$ and $r_4$ irrespective of the current in $R_p$. For use in the acidimeter described, the point of fixed potential is chosen at a potential of −.4475 volt corresponding to a pH of +0.1.

(c) E can be made equal to zero but not independent of $I_1$ if (from Equation 10):

(11) $\quad I_1\left[R_{LS} - \dfrac{r_1 R_p}{r_1+r_2}\right] = \dfrac{E.M.F.}{r_3+r_4}\left(\dfrac{r_1 r_2}{r_1+r_2} + r_3\right)$

Conclusions

1.—From Equation (10), E is a linear function of $I_1$ and $R_{LS}$ or of $R_{LS}$ alone when $I_1$ is fixed, since all of the other factors of Equation (10) are constants of the circuit.

2.—Also, from Equation (10), E is independent of I, for the one case when the slider is set so that $$R_{LS} = \dfrac{r_1 R_p}{r_1+r_2}$$

and E for that condition is equal to $$-\dfrac{E.M.F.}{r_3+r_4}\left(\dfrac{r_1 r_2}{r_1+r_2} + r_3\right)$$

which is always negative in sign for the given circuit arrangement.

3.—From Equation (10) observe that E is zero when $$I_1\left(R_{LS} - \dfrac{r_1 R_p}{r_1+r_2}\right) = \dfrac{E.M.F.}{r_3+r_4}\left(\dfrac{r_1 r_2}{r_1+r_2} + r_3\right)$$

A.—From Equation (11) note that the position of the zero point on the pH scale is a linear function of $I_1$ and $R_{LS}$, the two independent variables. For constant $I_1$, $R_{LS}$ becomes fixed and vice versa. Also, if $I_1$ is increased (the case when the temperature increases and is compensated for) note that $R_{LS}$ is decreased, or that the zero point will be lower on the pH scale which corresponds exactly to the result obtained in Fig. 8.

B.—From Equation (11) and Conclusion 2 above, observe that the expression within the brackets, i. e., $$\left[R_{LS} - \dfrac{r_1 R_p}{r_1+r_2}\right]$$

may be set equal to $R_{KO}$, since the bracket expression is equivalent to the distance between the slider position and the point where E=0, (point O in Fig. 6) and is likewise equal therefore to the difference in pH values between these two points. Thus rewriting Equation (11):

$$I_1 R_{KO} = \dfrac{E.M.F.}{r_3+r_4}\left(\dfrac{r_1 r_2}{r_1+r_2} + r_3\right) = C \text{ (a constant)}$$

From this, it is seen that $R_{KO}$ is inversely proportional to $I_1$, or that the pH corresponding to zero E decreases linearly and in inverse proportion to the increase in I₁. Note that the inverse proportionality exists only between I₁ and R_KO, and not between I₁ and R_LS. This is a particularly important requirement which must be met by any potentiometer system for operation with a glass electrode and calomel cell.

4.—Note that the lead resistance and unused end turn resistances on the ends of the potentiometer winding outside the scale ends do not enter at all into the above formulae, so that they may be of any convenient value, which is of great advantage in simplifying the manufacture of the potentiometer. Contrast this condition with that of the temperature correcting circuit of Fig. 9 covering the range of only +0.1 to +9.5 pH.

*Summarizing*

The potentiometer circuit of Fig. 1 has the following advantages:

(1) It delivers a potential that varies linearly with slider position;

(2) It reverses potential at any predetermined point on the slide resistor;

(3) It maintains the potential of any predetermined point on the potentiometer at a constant value regardless of the setting of temperature compensation switch 106 after restandardization;

(4) It shifts the point of zero potential and changes the slope of the pH scale vs. E. M. F. characteristic in response to adjustment for temperature compensation whereby correction can be made for the temperature vs. E. M. F. coefficient of a glass electrode—calomel electrode cell for all pH values between −1.0 and +9.0 in such manner that the pH scale on the potentiometer is direct reading for all temperatures;

(5) It employs only one calibrated and tapped resistor 103 and only one temperature compensating switch 106;

(6) It employs a slide resistor 89 having no tap connections thereon;

(7) It eliminates any necessity for avoiding "end coil" resistance in the slide resistor 89 beyond the right and left scale limits of the potentiometer.

With respect to advantage (7) illustrated above, it should be noted that in a system of the type disclosed in Fig. 9 there must be no resistance between the left end of the slide resistor (the point corresponding to a pH scale reading of +0.1) and the end of resistor 92 which is connected thereto.

Stated in a different way, the potentiometer circuit of Fig. 1 provides temperature compensation without:

(1) Extra electrical or mechanical connections to the plain potentiometer winding or disc;

(2) A plurality of pH scales;

(3) Additional sliding contacts on the potentiometer slide resistor;

(4) Readjustments of index (usually a hair line) for reading the pH scale;

(5) Switches or other equipment actuated mechanically by the potentiometer disc or pH scale.

By avoiding the foregoing defects, the accuracy of the instrument is increased and the expense of building and maintaining it reduced.

*Measuring values of pH above +9.5 pH*

Figure 15:
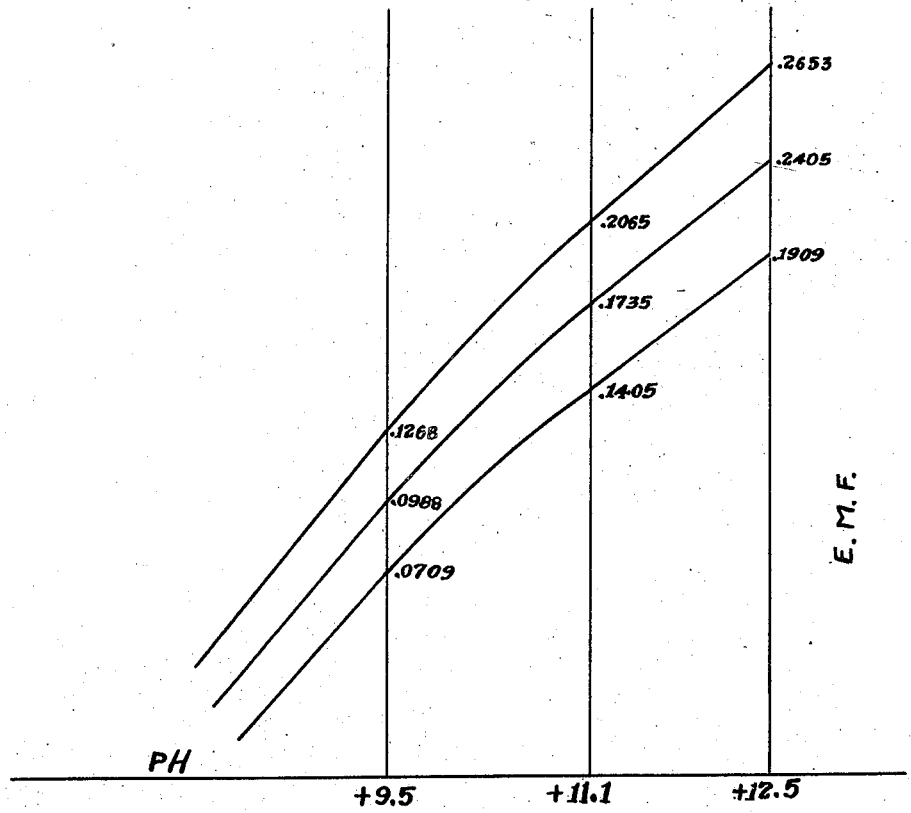
Fig. 15 is a diagram illustrating the relation between the pH of a solution employed in a glass electrode-calomel electrode cell and the potential across the electrodes of the cell over the pH range from +9.5 to +12.5.

The change in E. M. F. with change in solution pH of a glass electrode-calomel electrode cell is linear only up to a pH of +9.5. Between pH values of +9.5 and +11.1 the E. M. F. rises at a successively reduced rate per unit change in pH, but above a pH of 11.1 the relation is again linear although the slope of the pH in E. M. F. characteristic above 11.1 pH is less than below 9.1 pH. Hence as shown in Fig. 5, the pH vs. E. M. F. characteristic for any given temperature is a straight line from −1.0 pH to +9.5 pH, but (from Fig. 15) is curved from 9.5 pH to 11.1 pH and beyond 11.1 pH is a straight line of reduced slope. It is possible to extend the range of any of the potentiometer circuits discussed from 9.5 up to 12.5 for any given temperature, by gradually reducing the distances between the graduations on the pH scale of the potentiometer over the range 9.5 pH to 11.1 pH (as shown in Fig. 16) and making the spacing between graduations uniform over the pH range 11.1 to 12.5, but less than that over the range −1.0 to +9.5. However, when temperature correction is accomplished electrically as previously described, absolute accuracy is only obtained over the range −1.0 pH to +9.5 pH. This will be apparent from observation of the fact that, in effect, the temperature correction circuits described rotate the E. M. F. vs. scale deflection characteristic of the potentiometer about the point −0.4475 volt until the straight portion of the potentiometer characteristic between −1.0 pH and +9.5 pH coincides exactly with the corresponding portion of the pH vs. E. M. F. characteristic of the cell to be measured, whereas the portion of any one of the characteristics in Fig. 15 beyond pH +9.5 cannot be made to coincide exactly with the corresponding portion of another of the curves merely by rotation about the −0.4475 volt point.

Fortunately, however, I have discovered that the errors introduced in the range above +9.5 pH by employing the temperature compensating circuits described are so slight that they can be disregarded and it is practicable to design the potentiometer to cover the pH range up to at least 12.5 pH units, which at present appears to be near the upper limit of accuracy of glass electrode cells.

As an example, in a potentiometer in accordance with Fig. 1, if the pH scale is calibrated to give exact pH readings over the entire range from −1.0 pH to +12.5 pH at a temperature of 25°, then when the temperature correction switch is set to 40° and a cell at that temperature having an actual pH of 12.5 is measured, the potentiometer scale indicates a pH differing from the actual value by only .06 pH, which is well within the ±0.1 pH accuracy claimed for the glass electrode itself. The conditions recited produce about the maximum error and at temperatures nearer that for which the dial is calibrated, and with solutions of lower pH, the error is proportionately less.

*Circuits for reducing errors resulting from leakage currents*

Referring to Fig. 1, it will be observed that when the switch 13 is thrown to connect the potentiometer 55 and test cell 1 in series across the input of the amplifier, the lead 9 extending from the glass electrode 3 is connected through switch contacts 11 and 15 and lead 19 to the control grid 21 of input tube 23. The glass electrode 3 may have a resistance from about 40 megohms up to about 500 megohms. This is an enormous resistance and it is obvious that very little leakage of current from the circuit elements 3, 9, 11, 15, 19 and 21 can be tolerated if the full potential of the cell 1 is to be impressed upon the grid 21.

The aforementioned application Ser. No.

748,048 describes methods of reducing leakage from the grid 21 within the tube itself and also describes methods of supporting the elements 9, 11, 15 and 19 from remaining portions of the apparatus so as to obtain a high insulation resistance.

In accordance with the present invention, I further reduce the possibility of current leakage from the elements 3, 9, 11, 15 and 19 by so arranging the circuit that when a condition of balance is obtained, all possible leakage paths from those elements are intercepted by a conducting body that is at the same potential as the elements. Since current can flow between two points only in response to a difference in potential between those points, it follows that a balance no leakage can occur from the elements 3, 9, 11, 15 and 19.

The foregoing result is achieved by the simple expedient of grounding the lead 72 to the metal case and frame of the instrument instead of grounding the cathodes of the tubes as would be done if usual amplifier practice were followed.

Lead 72 is connected through switch 67 to the back contact 17 of switch 13 and to the junction of resistors 92 and 93 which, when the potentiometer is adjusted to yield a potential equal and opposite to that of the test cell 1, is at the same potential as contact 11. This method of reducing leakage current is clarified in Fig. 11 in which the various insulators necessary to mechanically support the elements 3, 9, 11 and 15, from the metal frame 111 are schematically illustrated. Thus in an acidimeter as actually constructed, insulating supports 113, 115, 117 and 119, are employed to support the switch contact 15, switch contact 11, the lead 9, and the glass electrode 3, respectively. The leakage path from the grid terminal of tube 23 to ground over the tube envelope is indicated as a resistance 121.

Figure 11:
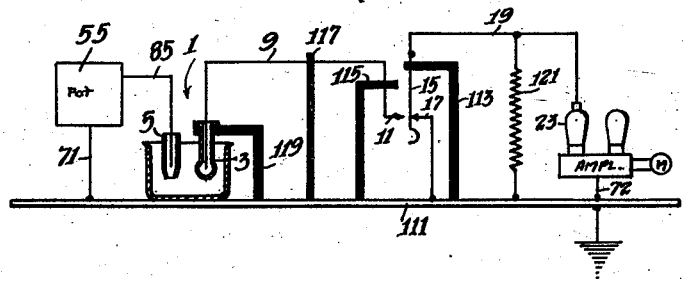
Fig. 11 is a schematic drawing illustrating the leakage paths in shunt to the high resistance circuit of an acidimeter employing a glass-electrode cell in combination with a potentiometer and vacuum tube amplifier.

It will be apparent from Fig. 11 that in order for any foreign potential to be impressed upon any one of the elements 19, 15, 11, 9 or 3, through the insulating supports of those elements, such potential would first have to be impressed upon the metal frame 111 and, since the latter is directly connected to the conductor 72, it will be impossible for any foreign potential to produce a leakage current through or over any of the insulating supports 113, 115, 117 or 119, tending to change the potential of the elements supported thereby or connected thereto from the potential of conductor 72.

The improvement obtained by grounding the circuit of Fig. 1 at the conductor 72 instead of at the filaments of the tubes, as was done in the system of the Beckman and Fracker application, Serial No. 748,048 previously referred to, may be calculated as follows: If the system were grounded at the cathodes of the tubes, then the potential difference at balance between the grounded frame of the apparatus and the elements 19, 15, 11, 9 and 3 would be practically 3 volts with new A batteries and the average type 32 tube which is employed for the tube 23. In the present circuit of Fig. 1 (with the resistor 57, which will be discussed later, omitted), when the potentiometer 55 is adjusted to balance the potential of the cell 1 within ½ millivolt, which is easily done, then the potential difference between the grounded frame and the elements 19, 15, 11, 9 and 3 will be in the neighborhood of ½ millivolt.

Assuming that the insulation resistances are the same in each instance, the effective insulation has been improved by a factor equal to the ratio of $$\frac{3}{.0005}$$

or 6000 times, a distinctly valuable improvement and one obtained simply by altering one wire connection.

The circuit of Fig. 1 also greatly reduces the difficulty of maintaining a high leakage resistance of the insulators positioned adjacent the test cell 1 which is preferably enclosed in a compartment where high humidities are encountered.

If the circuit were grounded at the cathodes of the tubes in accordance with the practice disclosed in the aforementioned prior application, the effective insulation resistance would be relatively independent of the potentiometer setting (since the biasing potential of approximately 3 volts existing between the cathodes and the conductor 72 is large as compared to the potential developed by potentiometer 55) although the worst condition would occur when the potentiometer was set to either +0.25 volt when the glass electrode and calomel electrode were delivering their maximum E. M. F. of −0.5 volt. In the latter case the potential between the grounded frame of the apparatus and the conductor 19 would be approximately 3.7 volts.

With the system as disclosed in Fig. 1, however, the effective insulation resistance does depend to a greater extent upon the setting of the potentiometer relative to the E. M. F. of the test cell, but even under the worst conditions of unbalance the effective insulation resistance is still several times greater than the previous circuit. For example, the worst case, as before recited, occurs when the potential difference between the potentiometer and the test cell reaches its maximum of 0.71 volt, in which case the effective insulation resistance would be about 5.3 times as great as with the previous grounding system and would still be approximately 4.2 times higher than the best insulation resistance obtainable with the previous circuit.

However, the current leakage when the circuit of Fig. 1 is unbalanced is so slight that it does not affect the operation when ordinary glass electrodes are employed. If an extremely high resistance micro-electrode were to be used, then it would be desirable to first balance the potentiometer against the test cell and then allow several minutes to elapse before taking the final reading to permit time for the disappearance of any possible polarization effects that might have occurred when the potentiometer was badly off balance.

To prevent confusion, in Fig. 11 the necessary physical supports for the potentiometer 55, the lead 85 and the calomel electrode 5, have not been indicated. The insulation requirements of the supports for these elements are not severe, despite the fact that, at balance, the potentials of conductor 85 and electrode 5 differ from ground potential by the E. M. F. produced by the potentiometer, and the test solution in which electrodes 3 and 5 are immersed is at a potential differing from that of electrode 5. The reason for this is that the potentiometer 55 has a relatively low resistance of the order of magnitude of 1000 ohms, and hence the conductor 85 and calomel cell 5 are at a very low impedance level with respect to ground, as compared to the impedance level of the glass electrode and the elements connected thereto. If the maximum allowable error in the potentiometer circuit is held to approximately ½ millivolt and if the maximum potentiometer E. M. F. is .5 volt, then the minimum insulation resistance required for the potentiometer elements and the calomel cell will be in the neighborhood of 1,000,000 ohms, which is an overall wiring insulation resistance that may be easily obtained.

*Circuit for reducing swinging of the meter needle when the comparing switch is actuated*

In a conventional D. C. amplifier of a type containing no inductances or capacities, as illustrated in the aforementioned previous application, the output current of the amplifier changes rapidly in response to a change in the grid potential of the input tube. The result is that whenever the switch in the former system corresponding to switch 13 in Fig. 1 of the present system is actuated to shift the transfer contact away from the back contact and against the front contact, there is a moment during the transfer of the movable contact when it is connected to neither the back nor front contact, thereby leaving the grid of the first tube floating, which allows the plate current of the first tube to rise and the plate current of the output tube to fall, permitting the needle of the milliammeter to fall to zero. As a result, every time the comparing switch in the system of the prior application is actuated the milliammeter needle shows a deflection that is not only annoying to the operator but that may give rise to amplifier drift unless the switch contacts are carefully adjusted so that the length of time that the grid circuit is open is short compared to the period of the output meter. The drift is caused by the fact that changes in the plate current of a type 30 tube, which is employed as the output tube, are reflected as filament current changes and the readings of the output meter are very sensitive to alterations in the filament current of the input tube (a type 32 tube) because of the fact that the filament is normally operated at a very low temperature. As a result, a momentary 100% change in the plate current of the output tube may cause very appreciable drift which is particularly annoying in that it begins when readings are being taken.

It is possible to reduce the drift by adjusting the contacts of the transfer switch very carefully so that the moving contact is clear of the fixed contacts for only a very short interval of time, but such delicate adjustments are undesirable.

This condition might be prevented by so arranging the transfer switch as to cause the transfer contact to make on the front contact before it broke from the back contact. Such an arrangement is out of the question, however, as it would momentarily short the test cell and polarize it.

With connectional D. C. amplifier construction, undesired meter deflection and amplifier drift would also occur when switch 67 (Fig. 1) is actuated, during the standardizing operation. It has been suggested that the polarization and drift effects might be avoided during the standardizing operation, by employing a switch 67 that made contact before the break, and connecting a 50,000 ohm resistance effectively in series with the standard cell 99. However, such an arrangement has been found unsatisfactory because of errors introduced by variable feed back from the B battery leads through the wiring insulation, the error amounting at times to 6 millivolts in the potentiometer standardization. As an example, if ½ millivolt is set as the maximum error permissible then the current necessary to produce this E. M. F. through a 50,000 ohm resistor is $$\frac{5 \times 10^{-4}}{5 \times 10^{+4}}$$

which equals $1 \times 10^{-8}$ amperes. The overall minimum insulation requirement for the wiring of this circuit, which includes the B battery leads having a potential of 22.5 volts would be $$\frac{22.5}{1 \times 10^{-8}}$$

which equals 2500 megohms, an insulation requirement that is difficult to meet.

In accordance with the present invention, both drift and excessive meter fluctuations are eliminated, without the necessity of a delicate adjustment of the contacts of switch 13, by increasing the time constant of the amplifier. This is effected by connecting a condenser 131 between the grid and filament of the output tube 41. The condenser 131 acts as a reservoir to absorb or release current from or to the conductor 133 and the grid 39 of tube 41, thereby preventing sudden changes in the potential of the grid.

Thus referring to Fig. 12, the square bottom curve 134 represents the anode current of tube 41 plotted against time as grid 21 of tube 23 is disconnected from the grid return lead 72 for the interval of time t, with the condenser 131 disconnected. It will be noted that the current drops immediately to a low value and thereafter rises sharply to the original value, when the grid of tube 23 is again connected to the grid return lead 72. Such a change in the output current causes a corresponding fluctuation of the meter 47 in the output circuit of tube 41.

The use of the condenser 131 tends to prevent sudden variation in the grid potential of tube 41, and causes its anode current to fall and rise more gradually. As a result, when the grid circuit of tube 23 is momentarily opened for the time t, either by actuation of the comparing switch 13 or the standardizing switch 67, the anode current of the output tube 41 undergoes only a slight, gradual decrease and increase, as shown by curve 135 in Fig. 13.

The condenser 131, instead of being shunted across the grid-cathode circuit of the tube 41, might be shunted across the grid and cathode circuit of tube 23. However, one objection to locating it in this position is that it would not effect any improvement in the operation of the system when the standardizing switch 67 is actuated. Another objection is that it would be very difficult to produce a condenser having insulation and leakage resistance high as compared to that of a glass electrode cell. In addition, the charging current drawn by the condenser at the instant the glass electrode cell is connected thereto might be sufficient to polarize the cell. Displacement currents within the condenser might also affect the operation of the system if the condenser were shunted across the extremely high resistance input circuit of the amplifier.

The capacity of condenser 131 that must be employed depends, of course, upon the values of the other elements in the circuit, particularly that of the resistor 33. Where the resistor 33 has a value of about 20 megohms, which is in accordance with present practice, a condenser of .005 to .01 microfarad gives a time constant of the order of magnitude of ⅕th second, which is ample to take care of considerable variation in the contact adjustments of switch 13. A mica condenser should be used as such condensers have an exceedingly high insulation and leakage resistance, are permanent in capacity and show no dielectric absorption.

Obviously, many variations and minor refinements may be made in the circuit shown in Fig. 1 to obtain even smoother operation if it is required. Thus the value of the condenser 131 may be correlated with the natural period of the output meter, which has mechanical inertia corresponding to electrical inductance, thereby forming a low pass filter circuit. Even more complete freedom from meter fluctuations and drift could be obtained by changing the simple condenser arrangement disclosed, which is essentially a resistance-capacity filter, to a more complete electrical low pass filter circuit containing inductance as well as capacity. However, such further refinement is not justified in the acidimeter circuit disclosed.

Adjustment for varying sensitivity of the amplifier

The usual methods of controlling amplifier gain or sensitivity employed in A. C. amplifiers are not as a rule adaptable to D. C. amplifiers unless complicated multiple adjustments are permissible, since any change in the operating parameters of a D. C. amplifier will generally affect the steady reading of the indicating instrument used in the output circuit.

In the original acidimeter disclosed in the copending application Serial No. 748,048, no provision was made for varying the sensitivity of the amplifier. The amplifier therein employed was sensitive to a change in grid voltage of the first tube of about 0.1 millivolt and was arranged to give a sensitivity of not less than 1.5 millimeters movement of the needle on the indicating milliammeter for a change in grid voltage on the first tube of one millivolt.

In the present acidimeter a sensitivity of ⅓rd the former value, or 0.5 milliammeter needle movement per millivolt change in grid potential of the input tube has been deemed sufficient. It has also been found that sensitivity control is desirable on account of recently encountered variations in sensitivity of the type 32 tubes employed in the first stage. Therefore, to render all acidimeters uniformly sensitive some form of gain control is necessary.

Offhand, it would appear that there are many possible and obvious methods of reducing the gain of the amplifier circuit shown in Fig. 1. One such method would be to reduce the value of the 20 megohm coupling resistor 33 in the anode circuit of tube 23. This would have the advantage of not only reducing the gain but increasing the stability of the circuit and reducing the magnitude of interference produced by external A. C. fields. Increase of stability would result from the fact that parallel leakage paths through the C battery and wiring insulation would have less effect on the indicating meter. Stability would also be improved by virtue of the fact that since the 15 volt C bias battery 37 has a high capacity to ground, any motion of this battery changes its capacity, which therefore requires a charging current to flow through the coupling resistor 33. If the value of this resistor 33 were reduced the voltage across it caused by the charging current would be proportionately reduced. It would be advantageous to reduce the effect of external A. C. fields on the circuit as then it would not be necessary to so completely shield the apparatus, which would reduce the cost of manufacturing.

However, offsetting these advantages resulting from a reduction in the value of resistor 33 is the serious disadvantage that it would necessitate an increase in the value of the biasing battery 37 which would increase the size of the case necessary to hold the apparatus. It is desirable to make the apparatus portable and mount it in as compact a case as is compatible with reliable and accurate operation.

Another rather obvious method of reducing the sensitivity of the circuit would be to reduce the plate potential by reducing the size of the B battery 35 or by placing a shunt across the indicating meter. However, either of these expedients would reduce the length of the scale of the output meter over which the amplifier is uniformly sensitive. It would also reduce the useful life of the B battery in the circuit disclosed.

Still another method of reducing the gain is to reduce the filament potential on the tubes but this is objectionable because it more than proportionately reduces the useful life of the A battery and would necessitate the introduction of a variable resistance with attendant contact difficulties into the filament circuit, which is extremely sensitive to any variation in current.

Gain reduction by the introduction of resistance in series with the grid of the output tube 41 is possible but is objectionable because it would necessitate an excessively high value of resistance and a readjustment of the grid biasing potential.

Gain reduction could also be effected by introducing resistance into the plate circuit of tube 41 in series with the meter 47 but to achieve an appreciable reduction in gain the resistance would have to be so high that an indicating meter of smaller current-range more delicate and costly than the one employed (having a range of 0-1 milliampere) would be required.

Still another method of reducing gain that has been employed with some success is to divide the 20 megohm resistor 33 into two 10 megohm resistors connected in series and connecting the lead 133 from the grid 39 to the junction of the two resistors instead of to the upper end of the resistor 33, as shown in Fig. 1. This method, however, has the objection that, in order to maintain the mean plate current of the tube 41 at the desired value, it requires either that a larger C battery 37 be employed, or that the negative lead of the B battery 35 be disconnected from the positive terminal of the A battery 49 and connected between the two cells of the A battery, thereby reducing the effective potential applied to the plate of the output tube 41 (an undesirable change).

A method of gain reduction that is found to be more satisfactory than any of the foregoing methods consists in connecting a variable resistor 137 in series with the screen grid 27 of the input tube 23. The resistor 137 should preferably have a rather large resistance but it need have little current carrying capacity. A resistor having a value of about 3 to 6 megohms reduces the sensitivity to approximately the desired value.

This method of reducing or controlling gain is generally considered objectionable in conventional A. C. amplifiers. Thus, although it is common to adjust the gain in A. C. amplifiers employing screen grid tubes by varying the potential applied to the screen grid, it is considered necessary to vary the potential by some means (such as a low resistance potentiometer) which does not introduce a large resistance in series with the screen grid. This necessity of maintaining a low resistance in the screen grid circuit of a conventional A. C. amplifier is due, in part at least, to the fact that in such amplifiers the anode is always operated at a higher potential than the screen grid, under which conditions the current drawn by the screen grid is found to vary widely in different tubes of the same type, as purchased on the open market. In my system, on the contrary, the screen grid operates at a higher potential than the anode, and the gain control effect is due far more to the presence of the resistance, which changes the static screen grid characteristic to a dynamic one, than to the reduction in the voltage applied to the screen grid. As a matter of fact, it is objectionable in the amplifier circuit of Fig. 1 to reduce the potential applied to the screen grid to an extent sufficient to appreciably reduce the gain, because the region of maximum mutual conductance of the type 32 tube is determined by the ratio of the potentials applied to the control grid and the screen grid, respectively, and the negative bias on the control grid must be in excess of a certain minimum value in order to insure that the grid always will be sufficiently negative to maintain the input resistance of the tube high despite positive potentials applied to the grid as a result of the potentiometer 55 being out of balance with respect to the test cell potential.

The use of the resistor 137 so flattens out the overall dynamic characteristic of the entire amplifier that the region of uniform sensitivity is considerably increased on the output meter. It also has the desirable effect of maintaining a much more uniform amplifier sensitivity throughout the life of the batteries.

*Method of eliminating errors resulting from grid current in the input tube of the amplifier*

As has been explained in detail in the previous application Serial No. 748,048, an important advantage of using an amplifier in combination with a milliammeter (instead of using a galvanometer alone) for pH measurements with a glass electrode cell, is that the amplifier has an extremely high input resistance. However, even with the best design the input resistance of a vacuum tube amplifier, particularly when using ordinary commercial radio tubes, cannot be made infinite, and with extremely high resistance glass electrodes the grid current of the amplifier will cause errors if compensation therefor is not provided.

The manner in which the errors are produced will be explained with reference to Fig. 14, in which the equivalent circuit of a test cell having a glass electrode is represented by a generator 141 developing a potential $E_c$, in series with a resistance 143, which may be assumed to be 100 megohms. The potentiometer connected in series with the test cell is represented as a generator 145 developing a potential $E_p$ and having negligible resistance. A battery 147 represents the source of biasing potential on the grid 21 of the amplifier input tube and the resistor 149 represents the input or grid-cathode resistance R of the tube. Insulation leakage resistances have been disregarded in Fig. 14.

As shown in the circuit of Fig. 14, $E_1$ equals $E_p - E_c - (100 \times 10^6 \times I)$ where $I$ is the current flowing in the circuit. At balance $E_1$ is as nearly zero as the amplifier sensitivity and potentiometer construction will permit and if $E_1$ is exactly zero then $E_p = E_c + 100 \times 10^6 \times I$. Now if $E_p$ is expected to be within say ½ millivolt of $E_c$, then $I$ must not exceed $$\frac{5 \times 10^{-4}}{10^8} = 5 \times 10^{-12}$$

amperes. If the maximum allowable error is increased to .05 pH or 3 millivolts, then $I$ must not exceed $$\frac{3 \times 10^{-3}}{10^8} = 3 \times 10^{-11}$$

amperes, which is more nearly of the order of magnitude of the grid currents encountered among certain type 32 tubes.

If $I$ is to be kept to about $10^{-11}$ amperes, the value of R must be of the order of $2 \times 10^{11}$ ohms. However, micro glass electrodes have been developed which have resistances of about 500 megohms and, using such electrodes, if the maximum error is not to exceed .05 pH the current $I$ must be kept to $$\frac{3 \times 10^{-3}}{5 \times 10^8} = 6 \times 10^{-12}$$

amperes. Since this value of current is smaller than the input current of the amplifier disclosed in Fig. 1 for certain type 32 tubes, some means for increasing the effective input resistance of the tube 23 is desirable, particularly since this could be one of the largest sources of error in pH determination using the present acidimeter with high resistance electrodes.

I have discovered that the error resulting from grid current may be effectively compensated for by using the resistor 57 (Fig. 1) in series with the contact 17 of switch 13, the resistor 57 having a resistance approximately equal to that of the glass electrode 3. The manner in which resistor 57 functions to reduce the error caused by grid current will now be explained.

Grid current flows continually and is unaffected in magnitude by the presence of ordinary values of high resistance in series with the grid. Furthermore, at balance the potential driving the grid current remains the same regardless of whether the switch 13 is in the normal or operated position since in either case the return circuit from the grid is to the grid return lead 72, which is biased with a constant negative potential relative to the cathode of tube 23. It follows then that if the resistor 57 has exactly the same value of resistance as the glass electrode 3, then the potential drop occasioned by grid current between the grid return lead 72 and the contact 15 of switch 13 is the same regardless of whether the contact 15 is resting against contact 17 or contact 11.

It is not necessary that the value of resistor 57 exactly equal the glass electrode resistance for in the case of a 100 megohm glass electrode with the maximum error set at ½ millivolt and a grid current of $2.5 \times 10^{-11}$ amperes (which would give in Fig. 1, if resistor 57 were eliminated, a grid current error of 2½ millivolts) a value of resistance for resistor 57, within $$\pm \frac{5 \times 10^{-4}}{2.5 \times 10^{-11}}$$

or within 20 megohms of the 100 megohm optimum value, is sufficiently close to keep the error within the specified limit. For lower resistance glass electrodes the permissible tolerance in resistor 57 is even larger or conversely glass electrodes do not have to be kept within close resistance limits to keep the maximum error within a specified value for a size of resistor 57 which may be standardized in the acidimeter construction. A reduction in the measuring error due to grid current by a factor of at least 5 is very readily gained by the use of the resistor 57 and much greater improvement can, of course, be had by using lower resistance glass electrodes and/or allowing, for instance, a lower percentage variation between the resistances of the glass electrode and of the resistor 57.

The described method of decreasing the effect of grid current possesses further advantages from a manufacturing viewpoint in that it allows much wider tolerances in grid current among different type 32 tubes and imposes less severe requirements on the filament current adjusting resistor 53 connected across the filament of the tube 23. In fact, it becomes possible, by using the balancing resistor 57, to allow the grid current limit to be established, not by the extremely small voltage drop through the glass electrode resistance as was formerly necessary, but by the much larger current necessary to polarize the cell which easily may be more than 1000 times greater. This means that greater latitude in selection of circuits is possible, thereby increasing amplifier stability and reducing manufacturing costs through elimination of inspection operations.

The introduction of the resistor 57 reduces the effectiveness of the ground on the lead 72 in preventing leakage current from the circuit elements 19, 15, 11 and 3, the loss in effectiveness being dependent on the potential drop between conductor 72 and the contact 17 of Fig. 1 occasioned by the resistor 57. In the previous discussion of the reduction in leakage current obtained by grounding conductor 72 instead of the cathode of the tubes, it was assumed that the resistor 57 was not employed. However, even if a voltage of, for instance, 2½ millivolts, which may be a value realized in practice, exists across resistor 57, then instead of the factor of improvement resulting from the grounding of the lead 72 being 6000 as before, it will be dropped to $$6000 \times \frac{.5}{2.5} \text{ or } 1200,$$

but the overall accuracy is still greatly improved, as the reduction in the grid current error more than offsets the increased insulation leakage error.

To properly convey an understanding of the invention and its operations, certain specific embodiments thereof have been described in detail. It is to be understood, however, that various modifications of the particular circuits shown will occur to those skilled in the art and the invention is not limited to the particular circuits disclosed, but only to the extent set forth in the appended claims.

I claim:

1. In a calibrated potentiometer for balancing the E. M. F. of and indicating directly at a plurality of temperatures the pH of a test cell, which cell has a constant potential other than zero at all said temperatures at one value of pH but which has a potential which varies linearly with temperature change at other values of pH, a slide resistor calibrated in pH units, means for energizing said slide resistor, and calibrated means for electrically varying the scale vs. E. M. F. characteristic of said slide resistor to correspond to the pH vs. E. M. F. characteristics of the cell at different temperatures.

2. A circuit as defined in claim 1, in which said means for supplying said predetermined constant potential comprises a battery in series with a variable resistor, and means for indicating when the total potential across the battery and variable resistor is adjusted to said predetermined value.

3. A potentiometer for indicating directly at any one of a plurality of temperatures the pH equivalent of the potential of a pH test cell which cell has a constant potential other than zero for all said temperatures at one value of pH but which has a potential which varies linearly with temperature change at other values of pH, said potentiometer comprising a slide resistor graduated in pH units and a slide therefor, a first E. M. F. output terminal connected to said slide, means for supplying a predetermined potential to the ends of said slide resistor, a second E. M. F. output terminal, and means connected to said slide resistor for deriving therefrom and applying to said second output terminal a potential fixed with respect to the potential on the point of said slide resistor corresponding to said one value of pH, means for varying the potential applied to the ends of said slide resistor by predetermined amounts to vary the slope of the E. M. F. vs. pH scale characteristic of the slide resistor and cause it to correspond to the slope of the E. M. F. vs. pH characteristic of said test cell at a different temperature, and means for maintaining the point on said slide resistor corresponding to said one value of pH at the same potential despite said predetermined variations in the potential applied to the ends of said slide resistor.

4. A potentiometer for indicating directly at any one of a plurality of temperatures the pH equivalent of the potential of a pH test cell, which cell has a constant potential other than zero for all said temperatures at one value of pH but which has a potential which varies linearly with temperature change at other values of pH, said potentiometer comprising a slide resistor graduated in pH units and a slide therefor, a first E. M. F. output terminal connected to said slide, a first variable resistor and a source of constant E. M. F. connected in series with said slide resistor, a second resistor in shunt to said slide resistor and a second E. M. F. output terminal connected to a tap on said second resistor so positioned thereon as to provide a potential fixed with respect to that of the point on said slide resistor corresponding to said one value of pH, means for varying said first variable resistor to vary the current in said slide resistor and thereby vary the slope of the E. M. F. vs. pH scale characteristic of the slide resistor to correspond to the different slopes of the E. M. F. vs. pH characteristics of the cell at different temperatures, and means for varying the ratio of the resistances of the portions of said second resistor on opposite sides of the tap thereon to correct for shifts in the potential of the point on said slide resistor corresponding to said one value of pH produced by said variations in the current in said slide resistor.

5. A potentiometer for indicating directly at any one of a plurality of temperatures the pH equivalent of the potential of a pH test cell, which cell has a constant potential other than zero for all said temperatures at one value of pH but which has a potential which varies linearly with temperature change at other values of pH, said potentiometer comprising a slide resistor graduated in pH units and a slide therefor, a first E. M. F. output terminal connected to said slide, a source of current connected to the ends of said slide resistor for producing a potential drop therein, a second output terminal, and means for deriving from said source a constant reference potential and applying it to said second output terminal, means for maintaining the point on said slide resistor corresponding to said one value of pH at a fixed potential with respect to said constant reference potential despite variations in current in said slide resistor, and means for varying the current through the said slide resistor by predetermined amounts to vary the slope of the E. M. F. vs. pH scale characteristic of the slide resistor to correspond to the different slopes of the E. M. F. vs. pH characteristics of the cell at different temperatures.

6. A potentiometer for indicating directly at any one of a plurality of temperatures the pH equivalent of the potential of a pH test cell, which cell has a constant potential other than zero for all said temperatures at one value of pH but which has a potential which varies linearly with temperature change at other values of pH, said potentiometer comprising a slide resistor graduated in pH units and a slide therefor, a first E. M. F. output terminal connected to said slide, a temperature calibrated variable resistor having one end connected to one end of said slide resistor, a source of current of constant potential connected between the other end of said calibrated resistor and the other end of said slide resistor, a tapped resistor connected across said source and a second E. M. F. output terminal connected to the tap thereon, said tap being so positioned as to have a potential differing from the potential of the said other end of the slide resistor by the potential of said cell at said one value of pH, and said temperature calibrated resistor being so proportioned with respect to the slide resistor as to vary the current therethrough by such amounts as to vary the slope of the E. M. F. vs. pH scale characteristic of the slide resistor to correspond to the different slopes of the E. M. F. vs. pH characteristic of the cell at different temperatures.

7. A potentiometer for indicating directly at any one of a plurality of temperatures the pH equivalent of the potential of a pH test cell, which cell has a constant potential other than zero for all said temperatures at one value of pH but which has a potential which varies linearly with temperature change at other values of pH, said potentiometer comprising a slide resistor graduated in pH units and a slide therefor, a first E. M. F. output terminal connected to said slide, a temperature calibrated resistor having one end connected to one end of said slide resistor, a source of current of constant potential connected between the other end of said calibrated resistor and the other end of said slide resistor, a tapped resistor of large value relative to said slide resistor connected between said other end of said temperature calibrated resistor and a point on said slide resistor corresponding to said one value of pH, a second E. M. F. output terminal connected to the tap on said tapped resistor, said tap being so positioned as to have a potential differing from the potential of said point on said slide resistor by the potential of said cell at said one value of pH, and said temperature calibrated resistor being so proportioned with respect to the slide resistor as to vary the current therethrough by such amounts as to vary the slope of the E. M. F. vs. pH scale characteristic of the slide resistor to correspond to the different slopes of the E. M. F. vs. pH characteristics of the cell at predetermined different temperatures.

8. A potentiometer for indicating directly at any one of a plurality of temperatures the pH equivalent of the potential of a pH test cell, which cell has a constant potential other than zero for all said temperatures at one value of pH but which has a potential which varies linearly with temperature change at other values of pH, said potentiometer comprising a slide resistor graduated in pH units and a slide therefor, a first E. M. F. output terminal connected to said slide, a temperature calibrated variable resistor having one end connected to one end of said slide resistor, a source of current of predetermined potential connected between the other end of said calibrated resistor and the other end of said slide resistor, a first tapped resistor of total resistance of the same order of magnitude as the slide resistor connected in shunt to said slide resistor, a second tapped resistor of large value relative to said first tapped resistor connected between the tap on said first tapped resistor and the said other end of said temperature calibrated variable resistor, a second E. M. F. output terminal connected to the tap on said second resistor, the latter being so located as to have a potential differing from the potential of the point on the slide resistor corresponding to said one value of pH by the potential of said cell at said one value of pH, and said temperature calibrated resistor being so proportioned with respect to the slide resistor as to vary the current therethrough by such amounts as to vary the slope of the E. M. F. vs. pH scale characteristic of the slide resistor to correspond to the different slopes of the E. M. F. vs. pH characteristics of the cell at predetermined different temperatures.

9. Apparatus for measuring potentials in high resistance circuits, comprising an amplifier containing a vacuum tube having a grid and cathode, a pair of input terminals, means connecting one of said input terminals to said grid, and means including a source of grid biasing potential connecting the other input terminal to said cathode, indicating means connected to the output of said amplifier responsive to potential applied to said input terminals, and means comprising contacting elements for connecting a high resistance circuit the potential of which is to be measured in series opposition with a potentiometer across the input terminals of said amplifier, with the circuit to be measured positioned adjacent the grid terminal of the amplifier, in which the apparatus comprises a metallic supporting frame electrically connected to said other input terminal and in which the conducting elements connecting the grid of said tube to the circuit to be measured are supported by insulating elements extending directly from said metallic frame.

10. An acidimeter for measuring the pH of solutions, comprising an amplifier containing a vacuum tube having a grid and cathode, a pair of input terminals, means connecting one of said input terminals to said grid, and means including a source of grid biasing potential connecting the other input terminal to said cathode, indicating means connected to the output of said amplifier responsive to potential applied to said input terminals, a vessel for containing a solution to be tested, a pair of electrodes in said vessel adapted to extend into the solution therein, one of said electrodes having an extremely high resistance, a potentiometer having a resistance low as compared to that of said one electrode, means for connecting said electrodes in series opposition with said potentiometer across the input terminals of said amplifier, with said one electrode adjacent the grid terminal of the amplifier, in which the apparatus comprises a conductive supporting frame electrically connected to said other input terminal and in which the conducting elements connecting the grid of said tube to said one electrode of said cell and said one electrode are supported by insulating elements extending from said conductive frame whereby said frame intercepts all insulation paths between said conducting elements and other elements in said apparatus at potentials different from that of said frame.

11. In D. C. testing apparatus, a D. C. vacuum tube amplifier having an indicating meter in its output circuit and switch means for successively connecting to the input circuit of the amplifier different circuits, the potentials of which are to be compared with each other, in combination with means for increasing the time constant of the amplifier whereby sudden changes in the potential applied to the input circuit do not produce violent changes in said indicating meter.

12. In combination, a D. C. amplifier comprising a first tube and a second tube each having a cathode, grid and anode, switch means for switching the grid of the first tube from connection direct to its cathode to connection thereto through a source of potential to be compared, said switch disconnecting said grid completely from the cathode during transition from one connection to the other, a source of anode potential and a coupling resistor connected between the cathode and anode of said first tube, a source of biasing connection connecting the anode of the first tube to the grid of the second tube, a source of potential connected between the anode and cathode of said second tube, means for indicating variations in the anode current of said second tube, and a condenser connected in shunt to the cathode and grid of said second tube for preventing sudden violent fluctuations of the potential applied to the grid of said second tube following actuation of said switch means.

13. Apparatus for measuring potentials in high resistance circuits, comprising in combination a voltage indicating means having a pair of input terminals, a potentiometer adjustable to supply a potential equal to that of the circuit to be measured, a resistor of the same approximate resistance as that of the circuit to be measured, switching means for alternately connecting said potentiometer and the circuit to be tested in series with each other across said input terminals and connecting said input terminals together through said resistor, said voltage indicating means including a source of potential in series with said input terminals and having a substantially constant high input resistance.

14. Apparatus for measuring potentials in high resistance circuits, comprising in combination a D. C. amplifier having current indicating means connected in its output circuit, and comprising an input tube having a cathode and a grid with means for impressing a predetermined negative biasing potential in series between said cathode and grid, a potentiometer adjustable to supply a potential equal to that of circuit to be measured, a resistor of the same approximate resistance as that of the circuit to be measured, switch means for alternately connecting said potentiometer and the circuit to be tested in series with each other and with said source of biasing potential between said grid and cathode or connecting said resistor and source of biasing potential alone between said grid and cathode, whereby regardless of the position of said switching means the resistance in series with said source of biasing potential between said grid and cathode is substantially the same.

HENRY E. FRACKER.